Sept. 6, 1955  E. G. ROEHM  2,716,925
REPRODUCING MACHINE
Filed Nov. 6, 1952  5 Sheets—Sheet 1

INVENTOR.
ERWIN G. ROEHM
BY
H. X. Parsons & L. W. Wright
ATTORNEYS

Sept. 6, 1955                    E. G. ROEHM                    2,716,925
                              REPRODUCING MACHINE
Filed Nov. 6, 1952                                          5 Sheets-Sheet 2

INVENTOR.
ERWIN G. ROEHM
BY
*H. H. Parsons & L. W. Wright.*
ATTORNEYS

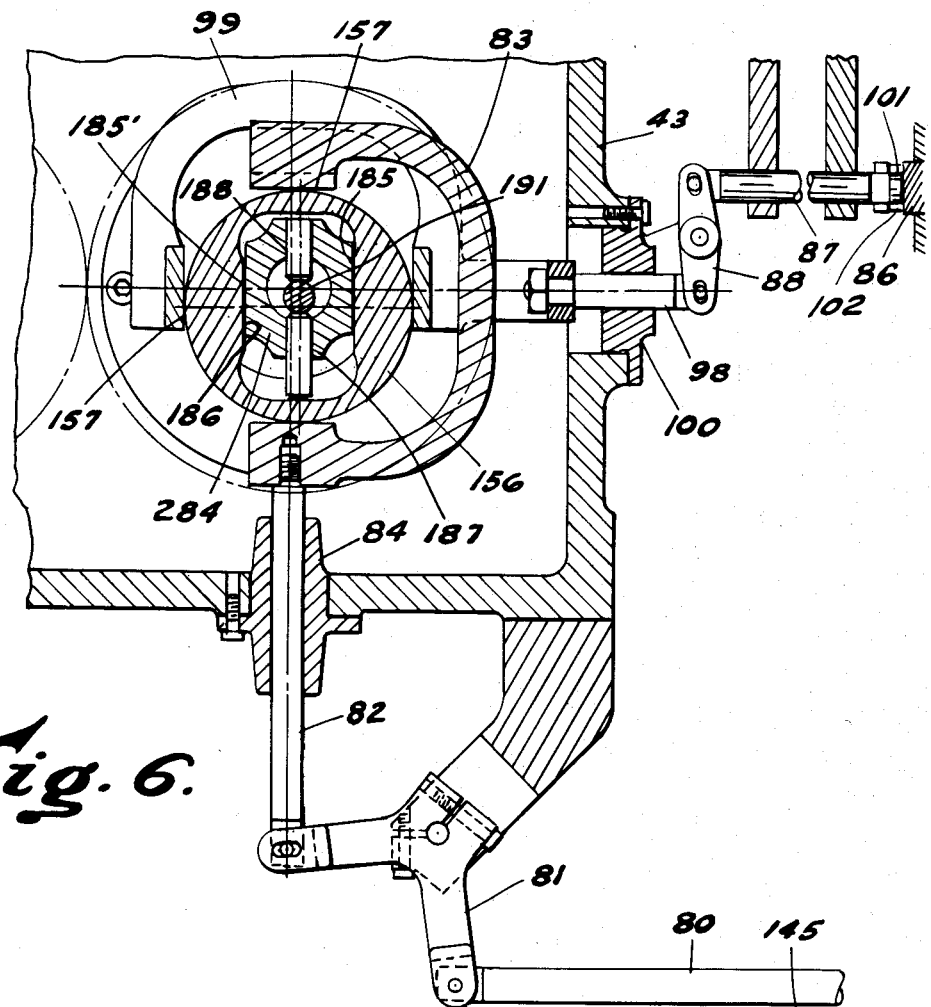
Fig. 6.
Fig. 7.
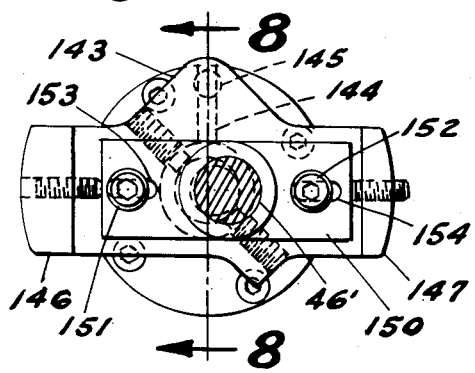
Fig. 8.
INVENTOR.
ERWIN G. ROEHM
BY
H. K. Parsons & C. W. Wright.
ATTORNEYS Sept. 6, 1955      E. G. ROEHM      2,716,925
REPRODUCING MACHINE Filed Nov. 6, 1952      5 Sheets-Sheet 5

INVENTOR.
ERWIN G. ROEHM
BY
H. K. Parsons & L. W. Wright.
ATTORNEYS

United States Patent Office 2,716,925
Patented Sept. 6, 1955

2,716,925

REPRODUCING MACHINE

Erwin G. Roehm, Norwood, Ohio, assignor to The Cincinnati Milling Machine Co., Cincinnati, Ohio, a corporation of Ohio Application November 6, 1952, Serial No. 319,117

6 Claims. (Cl. 90—13.5)

This invention relates to improvements in reproducing machines and has particular reference to that type of reproducing machine in which the relative movement of tool and work piece is automatically determined by pattern effected deflection of a movable tracer element. Reproducing machines as known in the art consist of two general types: one in which the tracer stylus is supported in rigid relationship to the cutting tool for manual or other operation by which maximum accuracy can be obtained, but at the sacrifice of automatic operation and capacity for appreciable stock removal, and the other in which the only limitation on stock removal is ordinarily the cutting capacity of the machine itself but in which the pattern following element or tracer, which automatically controls the profiling or contouring movement, is supported for deflection with respect to the cutting tool. The necessary extent of deflection of the tracer for accomplishment of automatic operation of the machine is a measure of the possible inaccuracy in work production. This, in the past, has imposed limitations not inherent in the cutting capacity of the machine itself as to the speed of cutting operation due to the inherent sensitivity of the tracer and its controlled valve mechanism and the lag in responsive movement of the parts of the machine in the event of rapid pronounced deflections of the tracer.

It is one of the objects of the present invention to provide a novel contouring machine and control mechanism therefor capable of high speed cutting operations under automatic control which will minimize or compensate for the error in duplication ordinarily resulting from the tilting or deflection of the tracer finger or contact member which operates in opposition to the form or pattern to be reproduced on the work.

A further object of the invention is the provision in a reproducing machine of an improved hydraulic control system embodying means for effecting a relative corrective adjustment of the tracer body or support and the cutting tool in a manner to compensate for the pattern produced deflections of the tracer contactor with respect to the tracer support.

Another object of the invention is the provision in a machine of the character above set forth of improved means for determining the amount of lead or eccentricity of the contact portion of the tracer with respect to the general operative axis of the tracer unit, together with means for effecting automatic initial setting or adjustment of the compensator mechanism control a variable amount, having a direct relationship to the eccentric adjustment of the contact portion of the tracer.

An additional object of the invention is the provision of an improved control mechanism particularly adapted for performance of contouring operations throughout a complete 360 degree orbital path of movement which will be effective to maintain the desired prescribed relationship of tool and tracer contactor at all points throughout said path.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

Figure 6 is a transverse section through the compensator control and associate parts on the line 6—6 of Figure 5.

Figure 7 is a view of the bottom of the tracer supporting unit looking in the direction of the arrows 7—7 in Figure 5.

Figure 8 is a transverse section on the line 8—8 of Figure 7.

Figure 10 is a plan view indicating in detail the free floating anti-frictional support structure for the cutting tool.

Figure 1:
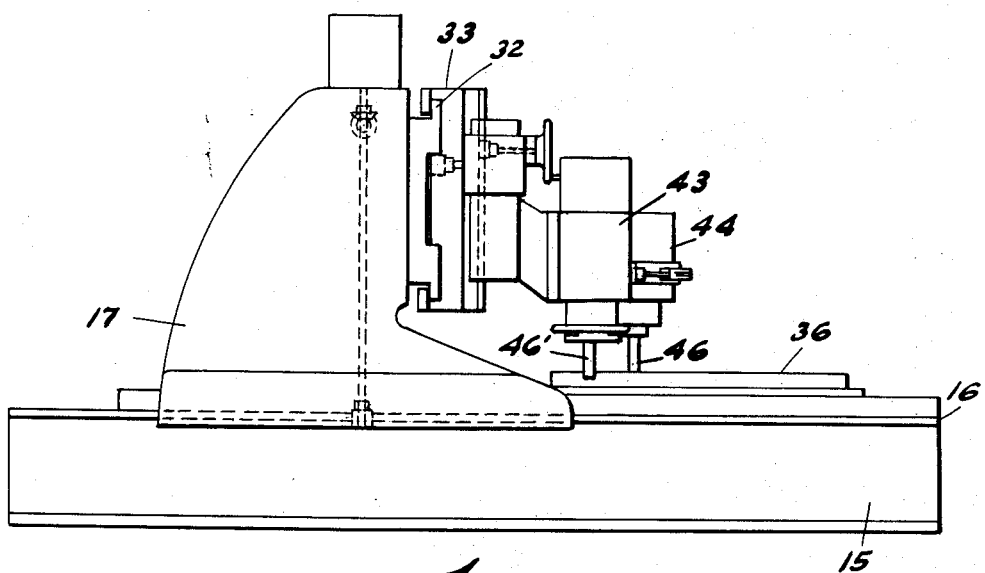
Figure 1 is an elevation of a machine embodying the present invention.
Figure 2:
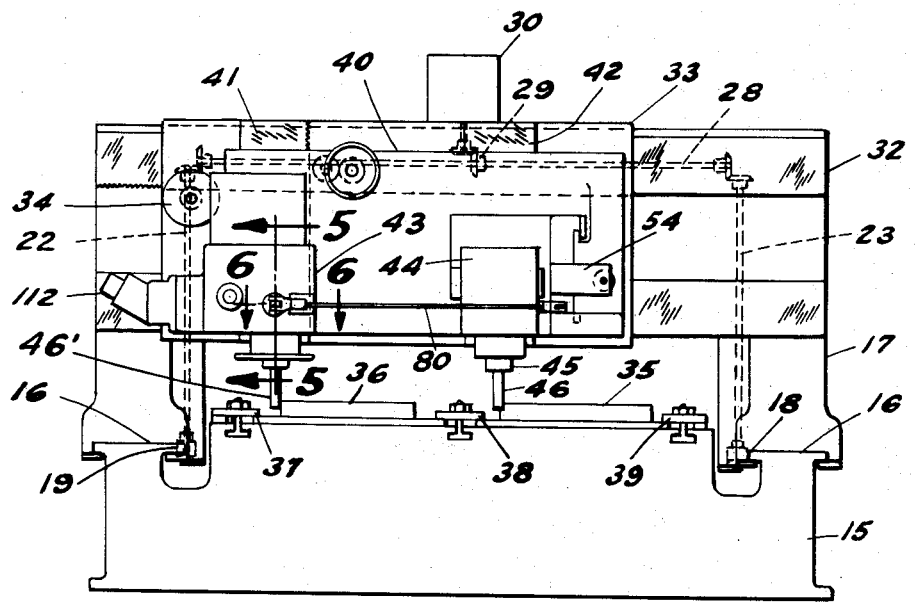
Figure 2 is a front view of the machine.

In the drawings the numeral 15 designates the bed of a contouring machine provided with the ways 16 supporting the column 17. The bed is provided with the rack portions 18 and 19 with which mesh the pinions 20 and 21 on shafts 22 and 23 provided with the upper pinions 24 and 25, in turn meshing with the pinions 26 and 27 on shaft 28. This shaft carries the central drive pinion or gear 29 rotated by hydraulic motor 30 through the medium of pinion 31 which meshes with pinion 29. It will thus be seen that on actuation of the motor 30 the column 17, through the drive gearing described, will be moved back and forth along the bed 15. The column is in turn provided with the transverse slideways 32 for the transverse slide 33 which through the medium of gear train, not shown, operated by the hydraulic motor 34 determines the transverse or in and out movement of slide 33 with respect to the bed 15 of the machine. By suitable correlation of the longitudinal and transverse movements of the column 17 and slide 33, the tool and tracer mechanism may be made to feed in any component direction to follow a pattern outline and correspondingly reproduce work throughout a complete 360 degree path.

The machine chosen for purposes of illustration is one designed for producing large work pieces such as employed in airplane construction, for example, in which the work piece 35 and pattern 36 are rigidly secured to the bed as by the fastenings 37, 38, and 39. For operation upon the work piece 35, the tool carrier 40 is supported for vertical adjustment on the ways 41 and 42 on the face of the traversing carriage 33 which, so far as the present invention is concerned, may be suitably positioned by either manual or automatic control means conventional in the art. Mounted on the slide 40 is the tracer control unit 43 and the cutter spindle drive unit 44. This latter unit includes the spindle 45 for the milling or cutting tool 46 and may include the drive motor 47 for effecting rotation of the tool. Intervening the members 40 and 44 is the first slide or support 48 movable in a direction toward or from the transversely shiftable carriage 33, this slide in turn supporting a second slide 49 movable with the slide 48 in a direction parallel to the direction of movement of the supporting column 17 and movable relative to the slide 48 in a direction parallel with the direction of movement of the transverse slide 33.

For controlling the movement of the tool supporting slide, the member 40 is provided with a cylinder 51 for the piston 52 having a rod 53 connected by a bracket 54 with the slide 48. Likewise, the slide 48 supports cylinder 55 for the piston 56 coupled by rod 57 and bracket 58 with the tool holder slide 44.

Figure 4:
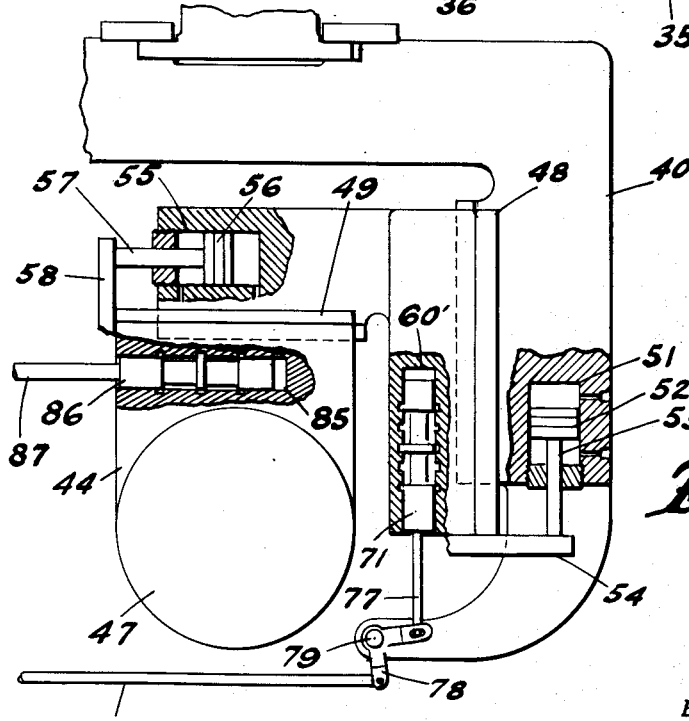
Figure 4 is an enlarged view partially in section of the cutter support and its adjusting mechanism.

As shown in Figure 4, the supporting ways for the slides 48 and 49 are of the plain bearing type. However, as particularly illustrated in Figure 10, the slide 40 has been shown as provided with a pair of spaced parallel ways for the anti-friction bearings 59 so that it is supported at balancing spaced points for maximum freedom for non-binding relatively minute movements and instantaneous response to any actuations of the piston 52. Likewise, the slide 49 is supported on the slide 48 by the additional sets 60 of interposed anti-friction bearings so that the transverse movement effected by actuation of the piston 56 will be frictionally unrestrained. Thus, the spindle carrier itself is mounted in an extremely free floating relation to the tool carrier slide 40 to facilitate compensating movements of the spindle and spindle carrier in angularly related directions in accordance with tracer deflections.

To regulate longitudinal movement of the slide 48 it is provided with a servo-valve mechanism including the valve chamber or bushing 60′ having the pressure receiving groove 61 and a pair of exhaust grooves 62 and 63. A conduit 64 couples the pressure groove with the main pressure conduit 65 extending to a suitable source of hydraulic medium under pressure such as the pump 66 fed from reservoir 67 through the conduit 68. Correspondingly, the exhaust ports or grooves 62 and 63 are coupled by the conduit line 69 with the general exhaust conduit system 70 of the machine which returns the exhaust or low pressure hydraulic medium to the reservoir 67. Slidable within the valve bushing 60′ is the valve 71 having a central spool portion 72 determining the distribution of pressure medium to the conduits 73 and 74 coupled with the opposite ends of the cylinder 51. The valve has the additional spool portions 75 and 76 controlling the exhaust or return flow from the ends of the cylinder by way of the grooves or portings 62 and 63.

The valve is further provided with the projecting valve stem 77 which in the present instance is shown as pivoted to one arm of the bell crank 78 intermediately pivoted as at 79 to the slide 40 and having its other arm coupled by the pivoted rod 80 to a second bell crank 81, also pivotally mounted on the slide 40. The opposite end of this bell crank is coupled by the pivoted link 82 to a sliding yoke 83 constituting a part of the tracer unit mechanism. Rod 82 is guided in the bushing 84 carried by slide 40 restraining the movement of the yoke 83 to a direction longitudinally of the machine or parallel to the direction of potential movement of the slide 48.

A corresponding servo-mechanism including the servo-valve cylinder or chamber 85 and valve 86 having a stem 87 pivoted to the link 88 serves to control the tracer's movement of slide 49. This structure includes the central pressure groove 90 coupled with the pressure conduit 65 and the pair of exhaust grooves 91 and 92 coupled with the exhaust conduit system 69. The valve 86 is provided with the central spool 93 determining the flow of pressure through conduits 94 or 95 to the respective ends of the cylinder 55 for the piston 56 and the additional spool portions 96 and 97 controlling the exhaust flow from the cylinder by way of the grooves 91 and 92 to the exhaust or return conduit system. The link 88 is intermediately pivoted to the slide 40 and connected by the rod 98 to the transversely sliding yoke 99, the link having a bearing in the bushing member 100 carried by the tracer unit casing 43 to restrict movement of the yoke to a transverse shifting for control solely of the transverse movement of the slide 49.

It will be understood that under ordinary conditions the amount of movement of the slides 48 and 49 is relatively slight, ordinarily being at a maximum only a few thousandths of an inch. In Figure 6, rod 87 is shown with a headed end 101 riding in T-slot 102 to permit relative transverse movement of the parts while maintaining the position of valve 86.

Figure 5:
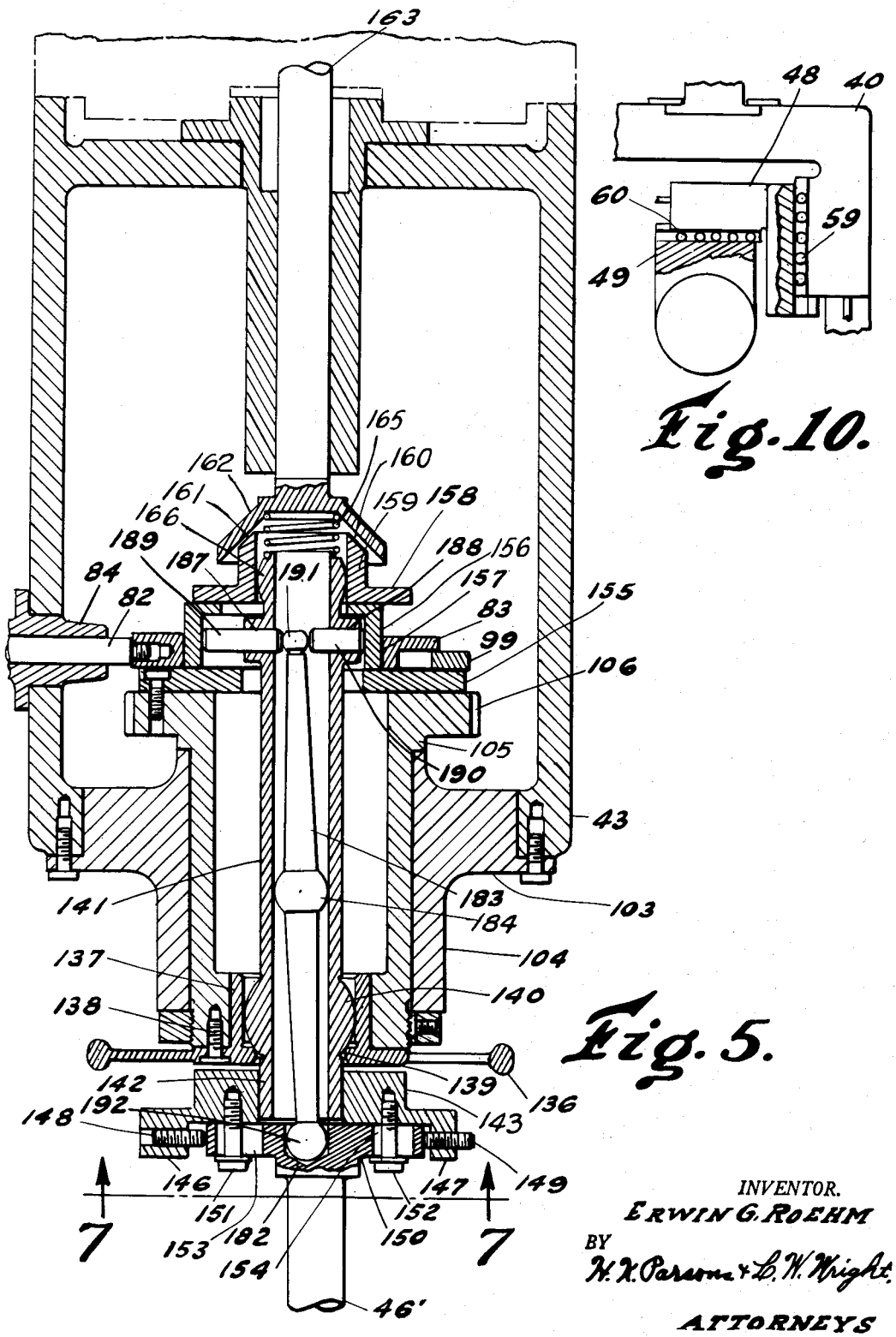
Figure 5 is a vertical section through the tracer and compensatory control on the line 5—5 of Figure 3 and looking in the direction of the arrows shown in Figure 3.
Figure 9:
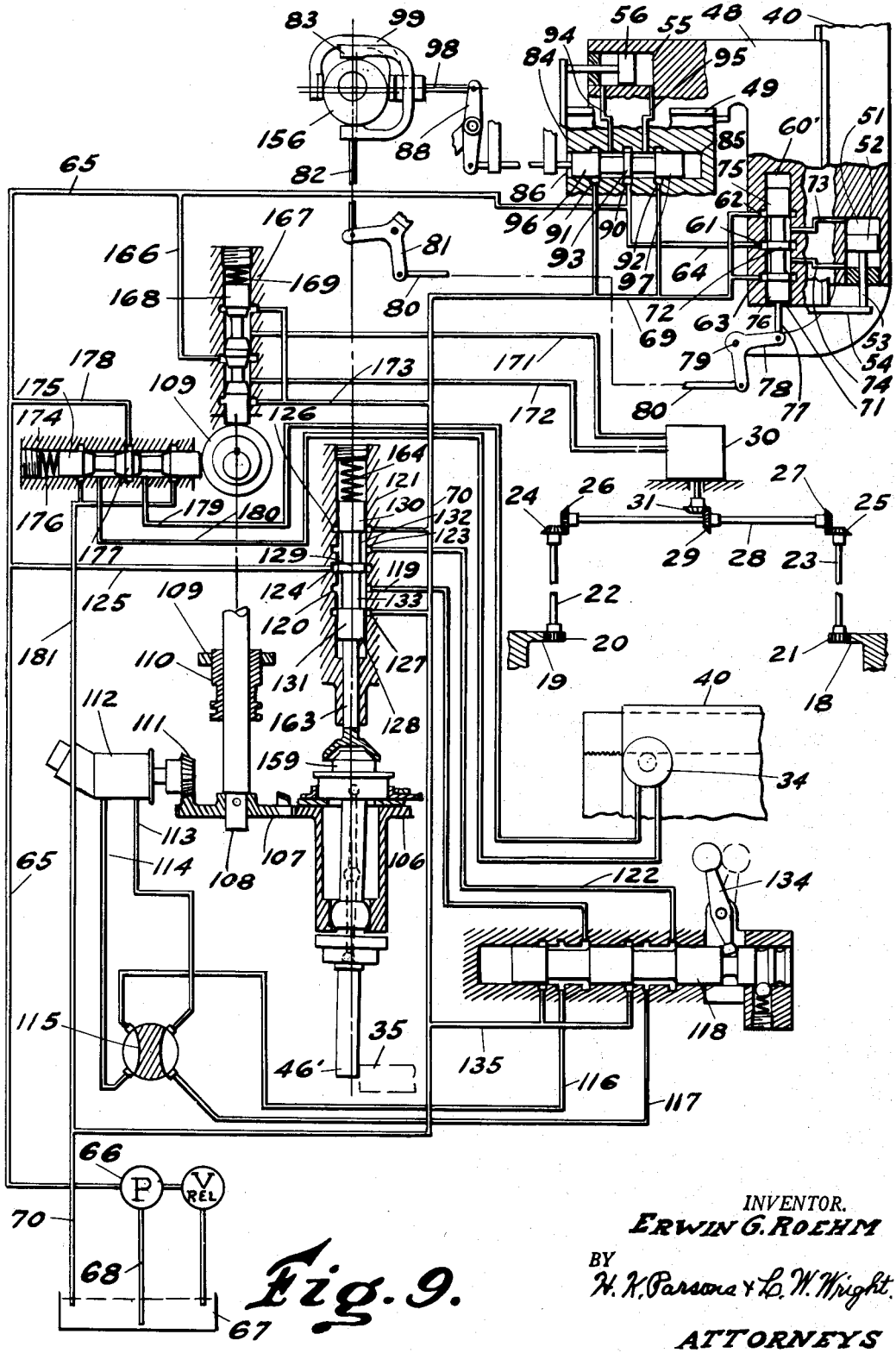
Figure 9 is a diagrammatic view of the hydraulic control circuit and essential control elements of the machine.

The structure for tracer control of the operation of the machine including the cutter position compensating mechanism just described is particularly illustrated in Figures 5 and 9 of the drawings. As there shown, the frame portion 43 of the tracer head unit has a lower closure plate 103 with a bearing portion 104 in which is rotatably mounted a bushing or sleeve 105 provided with a gear portion 106. This gear portion meshes with gear 107 on shaft 108 which carries the rate and direction of movement control cam 109 eccentrically displaceable by longitudinal movement of the adjuster 110 with respect to the shaft 108. The gear 107 and shaft 108 are rotated by pinion 111 reversely rotatable by hydraulic motor 112 to which extend the conduits 113 and 114. A reversing valve 115 determines the coupling of these conduits with the conduits 116 and 117 which extend to the selector valve 118. In the position shown, valve 118 couples conduit 116 with conduit 119 terminating in groove 120 in the tracer valve bushing 121. Correspondingly, the valve 118 couples conduit 117 with conduit 122 extending to groove 123 of the tracer valve bushing 121. This bushing has an intermediate groove 124 connected by conduit 125 with the pump line or pressure conduit 65 and the terminal grooves 126 and 127 coupled by branch conduits with the pressure return or reservoir conduit 70. Slidable in the bushing is the tracer valve 128 having an intermediate spool 129 disposed in opposition to the groove 124 and the terminal spool portions 130 and 131 controlling the flow from the valve grooves 132 and 133 to the reservoir grooves 126 and 127.

In Figures 5 and 9, the tracer finger or contact element 46 is shown as laterally deflected by the pattern 35 with the result that the valve spool 129 is moved upwardly from a centralized position to couple pressure conduit 125 by way of groove 124 and groove 120 with conduit 119 and by way of 116, 114 to the motor 112 to effect rotation of the motor and thus of the gear elements 107 and 106. At the same time, the conduit system 113, 117, 122 is coupled by way of groove 123 and valve groove 132 to the reservoir conduit 70, permitting rotation of motor 112. It will be evident that if the selector valve control handle 134 is moved from its full line to its dotted line position, as indicated in Figure 9, that the flow through conduits 119 and 122 will be blocked while at the same time both motor conduits 116 and 117 will be connected by the valve to the branch 135 of reservoir conduit 70, thus freeing the motor from hydraulic pressure and permitting manual steering of the machine by the wheel 136.

The rotatable sleeve 105 is closed at its lower end by a bushing 137 secured to the sleeve by bolts such as 138. This sleeve has a flange at 139 forming a seat for the ball portion 140 of the tubular tracer stem 141, the bushing having an inner cylindrical face permitting longitudinal sliding of the ball within the bushing. This tubular stem has a depending portion 142 projecting below the bushing to receive the cap plate 143 having a slot 144 receiving the driving pin 145 depending from the bushing 137 so that the parts will be rotated in unison. The plate 143 is provided with depending lugs 146 and 147 supporting the adjustable end stop screws 148 and 149 terminally engaging the slide 150. Bolts 151 and 152 carried by the plate 143 extend through slots 153 and 154 in the slide for securing the slide in adjusted position as determined by the setting of the end stop screws 148 and 149. The tracer finger 46′ may be secured to or formed integral with and depending from the slide 150, the adjustment of the slide determining the offset or eccentric relationship between the axis of the tracer and that of the tracer finger sleeve 141 and its ball support 140.

At its upper end the sleeve 105 carries a closure plate 155 providing a sliding mounting for the compensator adjusting cam 156 and the cam engaging yokes 83 and 99 which have the parallel face shoe portions 157, fitting against the periphery of the cam. Additionally, the upper face of the cam supports the flange 158 of collar 159 having a beveled upper face 160 opposing the inner conical face 161 of cone 162 disposed at the lower end of stem 163 of valve 128. A spring 164 contained within the valve bushing 121 urges the valve and member 162 downward into engagement with collar 159 effecting a centralization of the collar, while the additionally interposed spring 165 between 162 and the ball 166 on the upper end of the tracer sleeve 141 supplements the action of gravity in holding the ball 140 against its seat 139.

As particularly illustrated in Figure 9, lateral pressure against the lower end of the tracer finger 46' will rock the finger and sleeve as a unit about the ball and socket mounting 139—140 as a center, displacing the ball 166 at the upper end of the tracer sleeve in a direction opposite to the direction of displacement of the tracer finger. Such displacement will cause the ball correspondingly to shift with it the member 158, 159, the inclined upper face 160 exerting a camming action against the inner face 161 of the cone 162, imparting an axial upward movement to the tracer valve to effect a pressure coupling as described and thus a rotation of the motor 112 and the sleeve 105 in a direction tending to relieve the deflection of the tracer finger until such time as the pressure relief is sufficient for the spool 129 to assume a centralized position discontinuing such rotary movement. Particular advantage is gained by having the tracer contact member offset with respect to the axis of rotation of the sleeve due not only to the fact that a certain anticipatory reaction will take place, in that the tracer will contact irregularities of the pattern slightly before the necessary following contour movement of the cutter support mechanism as an entirety but also due to the fact that by this eccentricity as the tracer contact point is rotated it will of itself move in an arcuate path, tending to clear the obstruction and more rapidly restore the tracer to an undeflected condition than would be the case if this freeing action were dependent entirely upon the relative angularly related movements of the tracer point and pattern as determined by the feed movements. It will be understood that such relative feed movements are obtained in a conventional manner dependent on the vectorial relationship between the amount and direction of shifting of the column 17 with respect to the bed and the cross shifting of the slide 33 with respect to the column 17 with respect to the column. As has been described, the movement of the column with respect to the bed is effected by the motor 30 and associated mechanism while the cross movement of the slide 33 is effected by the motor 34. To control these movements, pressure line 65 has a branch 166 centrally coupled to the valve bushing 167 containing the direction determining valve 168 urged in one direction by spring 169 and variably controlled in opposition to the spring by contact of the end of valve 168 with the periphery of the rotatable, adjustable cam or eccentric 109. Opposite displacements of the valve as effected by this cam will cause the pressure to flow through conduit 171 or conduit 172 to motor 30 for effecting its operation, the exhaust pressure being simultaneously coupled by the valve through branch 173 to the main reservoir conduit 70.

Correspondingly, there is disposed at right angles to bushing 167 a second valve bushing 174 containing a second direction determining or distributor valve 175 urged in one direction by the spring 176 and having its position controlled by engagement of its inner end with the periphery of the cam or eccentric 109. Due to the right angle relationship of these two valve members one will be on a neutral or a central point of the eccentric as the other is at the high or low point as will be evident from Figure 9, while rotation of the eccentric from the Figure 9 position will dispose the valves in a relationship effecting controlled proportionate flows to each of the motors for determination of their relative rates of movement. By adjustment of member 109 through sliding of control element 110, the extent of eccentricity and thus the maximum amount of displacement of the valves 168 and 175 and consequent potential maximum rate of slide or column movement may be determined. Similarly, to valve 168, valve 175 has the central spool 177 determining the distribution of flow from the pressure branch 178 of pressure line 65 respectively to either conduit 179 or 180 extending to motor 34 while the return pressure of the other conduit is correspondingly simultaneously coupled to the branch 181 of the general reservoir conduit system 70. The amount of displacement of the valves 168 and 175 from a neutral position determines the throttling of the pressure and exhaust conduits of the respective motors and thus accurately regulates their operation.

In the control of massive machines of the type herein illustrated, employed in the machining of aluminum or other materials capable of being machined at high feed rates, it is necessary for accomplishment of these feed rates that the motor 112 also be operated at a high speed to effect the necessary instantaneous response to varying contours or outlets of the pattern. To effect adequate opening of the pressure control spool of valve 128 with respect to the pressure inlet port, an appreciable deflection must be given to the tracer point.

In automatic tracer controlled machines of the character here under consideration prior to the present invention the cutter head or support and the tracer unit support have been carried in fixed relation one to the other. Consequently, any tilting movement of the tracer with respect to its support causes either an approach or separation of the pattern contacting face of the tracer with respect to the work contacting face of the cutter, thus tending to introduce undesirable errors and surface irregularities in the produced work piece as respects duplication of the pattern surface or contour. As has been pointed out, it is one of the prime objects of the present invention to overcome this condition and to provide a machine which can be satisfactorily operated at high speeds and for maximum stock removal while minimizing such hitherto inherent errors in the completed work piece.

In the attainment of this result, the slide 150 is provided with a socket 182 disposed in an axial plane of the tracer finger parallel to the tangent plane of the contact face of the tracer but offset with respect to the axis of the tracer finger 46', this relationship being clearly illustrated in Figure 5. Fitting in this socket 182 is the lower end of the lever 183 having an intermediate ball or fulcrum portion 184 interiorly fitting the tracer sleeve 141, being thus supported for vertical and oscillatory movements with respect to the sleeve.

At its upper portion and below the valve controlling ball 166 the tracer sleeve 141 is formed with a substantially rectangular portion 284 providing a pair of guiding walls 185 and 186 for the inner sliding faces 185' of the compensator control cam 156.

These guiding walls extend parallel with the axial plane containing the socket 182 to guide the cam 156 for movement in a direction parallel with the direction of adjustment of the tracer contact finger 46' as determined by the bolts 151—152 and the slots 153—154 while maintaining the cam unit for rotation with the tracer sleeve 141 and the main rotatable sleeve 105.

Extending parallel with said walls 185 and 186 are the pair of opposed bores 187 and 188 slidably receiving the abutment pins 189 and 190 whose outer ends engage the inner face of the cam 156 and whose inner ends extend into engagement with the opposite sides of the ball 191 carried by the upper end of the lever 183.

By reference to Figure 5, it will be seen that the contact plane of the ball 191 with the pins 189 and 190 is the same distance above the contact plane of the ball 184 with the interior of the tracer sleeve 141 as the contact plane of the ball 192 at the lower end of the lever 183 is with the wall of the socket 182 is below the contact plane of ball 184. Consequently, upon any displacement or movement of the slide 150 with regard to the lower end of sleeve 141 an equal but opposite movement will be imparted through the upper end of the lever and the pins to the cam 156, variably to determine its eccentric or cam effect positioning.

This is a definite setting. The effective positioning of the periphery of cam 156 is offset toward the left as shown in Figure 5, causing a corresponding displacement of the yoke 83, rod 82, and rocking of bell crank 81 as shown in Figure 6. This rocking of the bell crank shifts valve 71 from the position shown in Figure 9 an amount corresponding to the forward offset of the tracer finger 46'. By this movement of the valve, actuating pressure is introduced into the forward or lower end of cylinder 51 as shown in Figure 9, causing a movement of piston 52 in a direction toward the body of the traversing slide 40 and a consequent adjustment of the compensating slide 48 to such position that the servo-bushing carried by the slide will catch up with the displaced pressure control spool 61, discontinuing the movement of slide 48 when the cutter support unit 44 has been shifted the incremental amount necessary to advance the cutter with respect to the slide 40 the same physical amount that the tracer contact finger 46' has been offset with respect to the axis of rotation of the tracer sleeve 141 and its rotary supporting sleeve 105.

Figure 3:
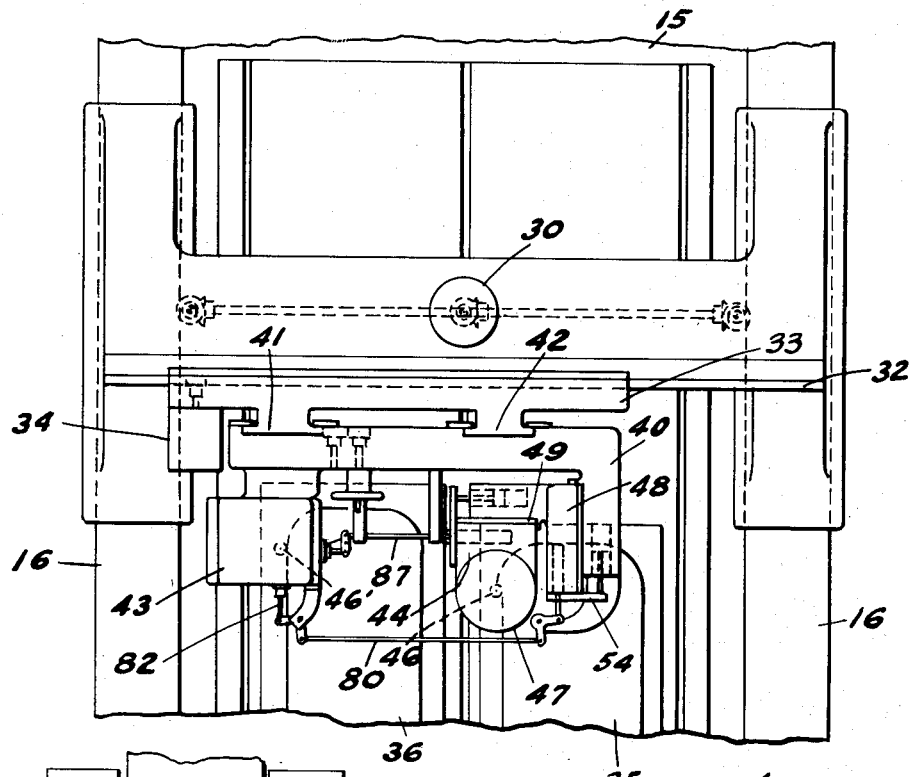
Figure 3 is a fragmentary plan view of the machine.

In the several views of the drawings the tracer mechanism has been shown in the operative position occupied when following along the left hand side of pattern as indicated in Figures 3 and 9. In this position of the parts, the tracer finger structure 46'—141 by contact with the pattern is held in a laterally deflected position toward the lieft in a direction at right angles to the plane of the section shown in Figure 5. This results in a tilting movement toward the right of the ball 166 and the upper end of sleeve 141 with a corresponding displacement of the collar 159, lifting valve 128 to establish a neutral position of the valve 128 in which the motor 112 will be locked against rotation with the feed control cam 109 positioned as shown in Figure 9, directing actuating medium to the motor 30 to move the column along the bed 15 toward the left as viewed in Figure 1 while maintaining the valve 175 in a centralized position so that motor 34 controlling movement of slide 40 is inactive. Such tilting movement of the tracer results in a movement toward the right of the rectangular portion 284 at the upper end of the tracer sleeve 141. Upon such movement the surface of the cam 156 will slide along the inner contacting faces of the yoke 83, maintaining valve 71 in its preset position but will react against yoke 99, moving this to the right as viewed in Figure 6. Such movement of yoke 99 to the right, through the linkage described, will effect a corresponding left hand movement to valve 86, introducing pressure into the right hand end of cylinder 55, moving piston 56 and thus slide 49 to the left, thus bodily shifting the cutter spindle unit 47 carried by the slide an amount corresponding to the amount of tilted displacement of the contact portion of the tracer finger. Such movement will be discontinued by the servo-action of the containing bushing for valve 86 when the cutter and its supporting slide have been established in their new position.

While for clarity of understanding the parts have been shown and described in connection with their two basic right angular adjustments, it will be evident to those conversant with the art that the initial presetting or positioning of the tracer finger 46' with respect to its supporting sleeve 141 establishes a permanent eccentric positioning of the cam member 156 with respect to the tracer sleeve in one plane which may be termed the plane of lead or direction of vectorial relative movement of tracer and pattern and correspondingly of cutter and work. However, in view of the fact that during the operation of the machine the basic tracer unit structure receives a rotary movement while the yokes 83 and 99 remain in a fixed or stationary position, this primary offset relationship may react on one or the other of the yokes, or, when in an intermediate position, simultaneously on both of the yokes, thereby causing simultaneous compensatory adjustments of both slides 48 and 49 and supported cutter with respect to the main slide 40. This preset relation is unaffected by any tilting movement of the tracer. However, as the tracer is deflected by pattern engagement from its basic vertical or undeflected position through the intermediate tilted position shown in Figure 9 in which the tracer valve is in neutral to a more deflected position reversing the effect of the pressure flow as respects the motor 112 corresponding variable eccentric positioning of the member 156 will be effected in a direction at right angles to the preset offsetting.

This variable positioning of the member 156 basically in a direction at right angles to the presetting and effective throughout the 360 degree rotation of the tracer finger and cam variably to react on one or both of the yokes 83 and 99 to cause a resultant vectorial movement of the cutter spindle unit 47 with respect to the main slide 40 in a direction corresponding to the direction and in an amount equal to the amount that the contacting portion of the tracer is deflected with respect to the tracer unit support 43.

From the foregoing description it will be evident that the present invention provides a supplemental auxiliary control mechanism for contouring or like machines in which the relative path of movement of work and cutter is determined by tracer following of a pattern and in which the deflectible tracer is effective, not only for determination of the manner of operation of the main contouring controls but is simultaneously effective to produce additive compensatory movement of the cutting tool in variable vectorial directions to maintain a constant relationship between the effective contact surface of the tracer and the cutting surface of the tool.

It will further be evident that by employment of such mechanism previous dimensional errors between pattern and work are eliminated and the machine may be operated at much higher speeds involving greater tracer deflections for attaining orbital responsive directional changes while at the same time increasing the accurate reproductional capacity of the machine.

What is claimed is:

1. A reproducing machine including a carriage, a tracer support and a tool support mounted on said carriage, a tracer finger mounted on the tracer support for displacement relative thereto, a first power means for moving the carriage in the angularly related directions, control connections between the tracer and power means for determining the operation of the power means in accordance with the deflections of the tracer with respect to its support, a second power means coupled with the tool support to move said tool support relative to the carriage in two angularly relative directions, and additional control connections between the tracer and said second power means for activating said second power means to move the tool support relative to the carriage in accordance with the displacement of the tracer with respect to its support.

2. A reproducing machine for effecting exact positional correspondence between the pattern contacting portion of a tracer and the work contacting portion of a cutting tool during a contouring operation, said machine including a work and pattern holder, and a tracer and tool holder, means for effecting relative movements of said holders in two angularly related directions, a tiltable tracer rotatably mounted on the tracer and tool holder having a depending pattern contacting portion displaceable with respect to its axis of rotation, a tool support mounted on said holder for movement in angularly related paths normal to said axis, and connections between said tracer and said tool support for bodily shifting the support with respect to the holder in correspondence with varying displacements of the contacting portion of the tracer with respect to the axis of rotation of the tracer.

3. A reproducing machine for effecting exact positional correspondence between the pattern contacting portion of a tracer and the work contacting portion of a cutting tool during a contouring operation, said machine including a support for pattern and work and a support for tool and tracer, a deflectable tracer carried by the tracer support having a body portion and a pattern contacting portion, means controlled by pattern produced deflections of the tracer for relatively moving the supports in an ambulatory path corresponding to a pattern outline, a tool holder carried by the tool support for movement with the support to follow said path, means mounting the tool holder for movement relative to the support, and additional means controlled by said deflections of the tracer for moving the tool holder relative to its support in a path corresponding in direction and amount to the direction and amount of the physical displacement of the tracer contact portion due to pattern produced deflection of the tracer with respect to the tracer support.

4. A reproducing machine for effecting exact positional correspondence between the pattern contacting portion of a tracer and the work contacting portion of a cutting tool during a contouring operation, said machine including a support for pattern and work and a support for tool and tracer, a deflectable tracer carried by the tracer support having a body portion and a pattern contacting portion, means controlled by pattern produced deflections of the tracer for relatively moving the supports in an ambulatory path corresponding to a pattern outline, a tool holder carried by the tool support for movement with the support to follow said path, means mounting the tool holder for movement relative to the support, and additional means controlled by said deflections of the tracer for moving the tool holder relative to its support in a path corresponding in direction and amount to the direction and amount of the physical displacement of the tracer contact portion due to pattern produced deflection of the tracer with respect to the tracer support, said additional means including a first piston and cylinder hydraulic motor for effecting one direction of displacement of the tool holder, a second piston and cylinder hydraulic motor for effecting displacement of the tool holder in a direction at right angles to that effected by the first hydraulic motor, servo-valves individual to the hydraulic motors for controlling their operation, and connections between the deflectable tracer and said servo-valves for effecting their operation in accordance with deflections of the tracer.

5. A reproducing machine for effecting exact positional correspondence between the pattern contacting portion of a tracer and the work contacting portion of a cutting tool during a contouring operation, said machine including a support for pattern and work and a support for tool and tracer, a deflectable tracer carried by the tracer support having a body portion and a pattern contacting portion, means controlled by pattern produced deflections of the tracer for relatively moving the supports in an ambulatory path corresponding to a pattern outline, a tool holder carried by the tool support for movement with the support to follow said path, means mounting the tool holder for movement relative to the support, and additional means controlled by said deflections of the tracer for moving the tool holder relative to its support in a path corresponding in direction and amount to the direction and amount of the physical displacement of the tracer contact portion due to pattern product deflection of the tracer with respect to the tracer support, said additional means including a control cam shiftable with and relative to the tracer, a supporting slide for the tracer contactor, means for securing the slide in adjusted position relative to the tracer body portion, whereby the contactor may be positioned in an anticipatory relation to the body of the tracer and a lever interconnecting the tracer supporting slide and cam for effecting an eccentric positioning of the cam with respect to the tracer body in correspondence with the slide effected adjustment of the tracer contactor with respect to the tracer body.

6. A reproducing machine for effecting exact positional correspondence between the pattern contacting portion of a tracer and the work contacting portion of a cutting tool during a contouring operation, said machine including a support for pattern and work and a support for tool and tracer, a deflectable tracer carried by the tracer support having a body portion and a pattern contacting portion, means controlled by pattern produced deflections of the tracer for relatively moving the supports in an ambulatory path corresponding to a pattern outline, a tool holder carried by the tool support for movement with the support to follow said path, means mounting the tool holder for movement relative to the support, and additional means controlled by said deflections of the tracer for moving the tool holder relative to its support in a path corresponding in direction and amount to the direction and amount of the physical displacement of the tracer contact portion due to pattern produced deflection of the tracer with respect to the tracer support, said additional means including a first piston and cylinder hydraulic motor for effecting one direction of displacement of the tool holder, a second piston and cylinder hydraulic motor for effecting displacement of the tool holder in a direction at right angles to that effected by the first hydraulic motor, servo-valves individual to the hydraulic motors for controlling their operation, and connections between the deflectable tracer and said servo-valves for effecting their operation in accordance with deflections of the tracer, said connections including a control collar, connections between the collar and tracer body for effecting orbital movement of the collar with the tracer body, a first yoke spanning the collar for movement therewith in one direction while permitting unrestrained movement of the collar in a second right angularly related direction, valve operating linkage intervening said yoke and one of said servo-valve mechanisms, a second yoke spanning the collar at right angles to the first yoke and actuable at right angles to the first yoke by movements of the collar, and additional linkage interconnecting said second yoke and the other servo-valve for operating said other servo-valve upon movements of its coupled yoke.

References Cited in the file of this patent
UNITED STATES PATENTS

| | | |
|---|---|---|
| 2,039,294 | Campbell | May 5, 1936 |
| 2,250,241 | Thalmann | July 22, 1941 |